United States Patent Office 3,506,602
Patented Apr. 14, 1970

3,506,602
EMULSION POLYMERIZATION PROCESS
John C. Floros, Lunenburg, Mass., and Chung Hwei Wei, Budd Lake, N.J., assignors to The Firestone Tire & Rubber Company, Akron, Ohio, a corporation of Ohio
No Drawing. Filed Jan. 22, 1968, Ser. No. 699,346
Int. Cl. C08d 9/12
U.S. Cl. 260—27            5 Claims

ABSTRACT OF THE DISCLOSURE

The production of polymers of conjugated diolefins with or without monovinyl aromatic compounds in an emulsion polymerization system has been found to be enhanced by the use of shellac as an emulsifying agent. The shellac is polymerized with the monomer components and becomes a part of the final resin latex. To insure statistical reliability of the process, it has been found that incremental addition of the shellac to the polymerization system during the course of polymerization in a manner to maintain the pH drift of the reaction mixture to a maximum of about 0.2 pH points will provide a statistically reliable process insuring a high conversion of a monomer to interpolymer and the avoidance of build-up on the reactor walls. The resulting latex is quite stable.

BACKGROUND OF THE INVENTION

This invention relates to the preparation of polymers of shellac with conjugated diolefins alone, or with monovinyl aromatic compounds, and to the latices so produced. In particular, it relates to the production of butadiene-styrene-shellac latices.

It has been known that shellac easily interpolymerizes with acrylic monomers in aqueous dispersions to form stable latices without the use of any surfactant. In such latices the shellac itself acts as the emulsifier. The acrylic-shellac polymers produced in this manner are characterized by a number of useful characteristics including improved adhesion to many substrates and are readily adapted to the production of films having excellent water resistance.

In contrast to the ease of incorporation of shellac in acrylic polymers, great difficulty has been encountered heretofore in incorporating shellac into styrene-containing polymers. Thus, in U.S. Patent No. 2,961,420, where interpolymers of styrene and shellac are disclosed, it is also set forth that such interpolymers contain only from about 10–30% by weight of the shellac chemically incorporated into the polymer, the rest being present as free shellac. In addition, U.S. Patent No. 2,961,420 teaches that a surfactant (a nonionic) should be used with the shellac to produce the requisite stability desired in the latex.

It was then found that butadiene and styrene could be interpolymerized without the use of soap-type emulsifiers by effecting polymerization in an aqueous emulsion of a reactant charge comprising at least about 18% by weight of a conjugated diolefin, up to about 75% by weight of a monovinyl aromatic compound and from about 2 to 30% by weight of solubilized shellac. The solubilized shellac, prior to polymerization, is in solution in the aqueous medium which has a pH in the range of from about 6.5 to 8.3 and preferably from about 7.0 to 7.8. No supplemental surfactant, emulsifier or shellac stabilizer is employed.

Latices produced in accordance with such process contain solids in which about 90% by weight of the shellac is chemically bound as an integral part of an interpolymer, i.e., no more than about 10% of the latex solids is methanol soluble. The latices are further characterized by excellent mechanical stability and films prepared therefrom are characterized as clear and self-supporting at room temperature, exhibit excellent adhesion, resistance to water and salt solutions and excellent electrical properties.

This subject matter is described in greater detail in Edris U.S. Patent No. 3,291,766.

The conjugated diolefins used in the Edris patent are butadiene-1,3, isoprene, chloroprene, pentadiene-1,3, piperylene and mixtures thereof. The conjugated diolefin may be separately polymerized with the shellac, or an admixture of the vinyl aromatic compound and the conjugated diolefin in the proportions desired may be copolymerized with the shellac.

The vinyl aromatic compounds used are styrene, alpha-methyl styrene, alpha-chlorostyrene and the corresponding halo, nitro, and methyl nuclear substituted derivatives thereof such as the vinyl toluenes, p-chlorostyrene, p-nitrostyrene, etc. Mixtures of the vinyl aromatic compounds may be used.

Optionally, minor amounts of copolymerizable vinyl or vinylidene monomers may be substituted for the conjugated diolefin portion of the polymerization charge. Up to about two-thirds of the diolefin charge may be replaced by such vinyl or vinylidene monomers but should comprise no more than about 25% by weight of the total monomer charge. Examples of such vinyl or vinylidene monomers are methyl isopropenyl ketone, divinyl benzene, vinylidene chloride, acrylonitrile, acrylamide, alkyl acrylates such as butyl acrylate, alkyl methacrylates such as methyl methacrylate, etc. Such monomers should, of course, be selected to insure that they do not react deleteriously with other components of the latex. Divinyl benzene, in many respects, acts like, and has often been treated by the art, as an equivalent of a conjugated diolefin. As a result, divinyl benzene can generally be included in the polymerization charge in somewhat greater quantities than the other vinyl and vinylidene monomers. It should not, however, replace more than two-thirds of the conjugated diolefin in the polymerization charge.

In accordance with the Edris process, shellac is dissolved in an aqueous alkaline medium and the polymerization is effected in the presence of this solution, e.g., by adding the monomer charge thereto, together with the polymerization catalyst and initiator. In preparing the aqueous shellac solution, the shellac may be mixed into the water which is then made alkaline by the addition of a suitable base such as ammonium hydroxide, borax or an amine such as diethanolamine, morpholine, etc. Heating may be used to aid in the solution. Where the interpolymer produced is to be used for electrostatic printing, it has been found that ammonium hydroxide or borax should be used for the solubilization.

Any commercial grade of shellac may be used. Some grades such as orange shellac produce color and/or cloudiness in the polymer. The physical properties of latices produced with such shellacs are satisfactory, but because of the color, their use is generally restricted to applications where this is not critical. It is preferred to use a refined shellac, i.e., a shellac which has been both bleached and dewaxed.

As the polymerization catalyst, there may be used one or more free radical catalysts such as azobisbutyronitrile, methyl ethyl ketone peroxide, benzoyl peroxide, t-butyl hydroperoxide, cumene hydroperoxide, ammonium, sodium or potassium persulfate, etc. If desired, the free radical catalyst may be activated by a suitable redox system as known to those skilled in the art.

The temperature of polymerization is not critical and any temperature commonly used in the art for the emulsion polymerization of these monomers may be used. Generally, polymerization will be carried out at a temperature of from about 15° C. to about 100° C. and preferably between about 40° C. and 80° C. The polymerization may be carried out batchwise or continuously. The polymerization reactants, e.g., the monomers, may be charged to the polymerization vessel intermittently or continuously as the polymerization proceeds or the entire charge may be added to the vessel prior to the initiation of polymerization. Additional catalyst or redox material may also be added to the system as the polymerization proceeds.

It had been recognized by Edris that to obtain highly stable latices without the use of an emulsifying agent and with the shellac chemically bound in the interpolymer, it was necessary that the pH of the emulsion prior to initiation of polymerization be no higher than about 8.3. At higher pH values serious floccing occurred. Edris also recognized that at pH values below about 7, while the polymerization proceeded satisfactorily, the solubilization of the shellac was insufficiently complete that free shellac remained in the system; films produced from such resins were found to have reduced clarity and other undesirable properties.

While the Edris process is effective for the production of the butadiene-styrene-shellac interpolymers in small quantities, the process is not statistically reliable when scaled up to commercial operations. By this is meant that the process will not operate at commercial scale with an economical probability of success. While the process sometimes operates successfully to form a stable latex with good yield, on numerous occasions either a low conversion of monomer to interpolymer is obtained or the entire mass sets up. In still other cases, while moderate yields were obtained without setting up the latex, there was a heavy build-up of polymer on the reactor wall. As a result, attempts to produce the polymer on a large-scale basis have met with more failures than successes insofar as obtaining a high conversion of monomer to interpolymer with the formation of a stable latex and with little build-up on the reactor walls.

THE INVENTION

It has now been found that a statistically reliable commercial process can be obtained by the practice of the process disclosed in the above-identified Edris patent if the shellac is introduced into the system incrementally. In particular, it has been found that the shellac should be introduced into the polymerization system at such a rate that the pH drift of the reaction mixture over the entire course of the reaction is maintained to a maximum of about 0.2 pH point.

As employed herein, "pH drift" refers to the change of pH that occurs as the result of the change in composition of the reaction mixture during polymerization. When all of the shellac is added as part of the initial monomer charge, the pH drops quite sharply with increasing solids and then levels off; typically, by the time the total solids has increased to 25%, the pH will have dropped well over 0.5, although generally less than 1, pH point, following which the pH will vary only slightly with increasing solids. By the method of incremental addition, the pH drift can be controlled to an approximately linear variation with the overall drift kept to about 0.2 pH point or less. When this careful pH control is maintained within the broad range of pH disclosed by Edris, high conversions, i.e., yields in excess of about 90% are obtained with very little floccing by the process of the present invention, as compared to floccing on the order of 80% and higher which is often obtained following the process disclosed in the Edris patent. The resulting latex is highly stable and useful in the manner described in the Edris patent.

In an example of incremental addition, four parts by weight of shellac per 100 parts of total monomer (including the shellac as part of the monomer) are introduced into a reaction vessel together with sufficient monomer and water to produce an interpolymer latex of the order of 50% or higher solids. The polymerization reaction is initiated after the inclusion of sufficient ammonia or other suitable base to bring the pH within the desired range. When the total solids content has reached about 15%, an additional one part of shellac is added. When the solids content has reached 25%, a second part of shellac is added. The incremental one-part additions are continued at 10% increments of solids increase until the desired shellac introduction has been completed. At this point, the polymerization can be continued to produce the final latex. Following this technique, the pH drift during the reaction will be maintained at about 0.2 and little, if any, floccing will be observed.

As a general rule, therefore, the process of the present invention constitutes the introduction of about half of the shellac to the emulsion polymerization system prior to initiation of the polymerization reaction; when total solids reach about 15%, the balance of the shellac is introduced in increments, generally evenly spaced according to solids concentrations, from about 15% solids concentration up to within 5% solids concentration below the ultimately desired solids concentration. Thus, for example, for a 40% solids latex, the increments would be spaced between 15% and about 35% solids.

Of course, it is possible to break the number of increments down into such slight additions that the number of such slight additions approaches infinity. Under these circumstances, of course, continuous addition of shellac is effected over the desired range of solids concentrations. This is merely a simple matter of fluid flow control and it is to be recognized that this also represents part of the concept of the present invention and is intended to be included by the requirement for incremental addition.

As was noted above, in general, at least about half of the shellac addition is to be introduced during the initial stage of the reaction. However, lesser amounts can be employed, but the amount of shellac initially introduced should not be less than about 3% by weight of the total monomer addition including shellac if reaction initiation difficulties are to be avoided.

If half of the shellac is to be added during the initial stage of the reaction, and if there is observed the further recommendation that the initial shellac should be not less than 3% of the total monomer, then these two conditions together impose a mathematical constraint that the total amount of shellac eventually entering into the charge (initially introduced shellac plus incremental shellac) shall constitute at least 6% of the total monomer charge.

In order to compare the reliability of the present invention with prior practice, a number of commercial size latex batches were prepared. In one group, all of the shellac was added at the beginning of the reaction in a single dose. Similar commercial size batches were prepared in which the shellac was added incrementally in accordance with the present invention. In each of the batches, 118 parts by weight of deionized water were charged to the reactor. In a separate container 32 parts by weight of deionized water, 0.7 part by weight of ammonium hydroxide and 8 parts by weight of shellac were mixed slowly with agitation. Agitation was continued for five minutes after the shellac had dissolved and the temperature was gradually raised to 50° C. until the solution turned clear. In the first batches, all of the shellac solution was charged to the reactor. In the batches produced in accordance with the present invention, only half of the solution was charged. In each case, the system was then agitated and 0.3 part by weight of $K_2S_2O_8$ and 67 parts by weight of styrene were charged to the reactor. Agitation was stopped and the reactor was then purged three times with nitrogen or butadiene. Butadiene (25 parts by weight) was then added to the purged reactor and the temperature raised to 140° F. to initiate the reaction. In the incremental addition batches when the total solids of the latex reach 15%, 3.9 parts of the shellac solution were added; at 25% total solids, 5.45 parts of shellac solution were added; at 35% total solids, an additional 5.45 parts of shellac solution were added; at 40% total solids the balance of the shellac, 5.55 parts, was added. When the total solids became constant, the reactor was vented and cooled.

Only 15% of the first group, the batches in which all of the shellac was charged with the monomer, could be considered successful. In 30% of these runs, the reaction mixture set up. In 25% of these runs, there was only a very low conversion to polymers. In the balance of the runs, the conversion was commercially too low and/or there was a heavy build-up on the reactor walls. However, all of the batches in which the shellac was charged incrementally were successful and produced a satisfactory latex.

Even the use of only two increments, e.g., an initial shellac charge and a final charge at about half the ultimate total solids provides significant improvement over the single addition technique. Obviously, however, the more numerous and more evenly spaced are the incremental shellac additions, the greater will be the degree of control and the more uniform and reproducible will be the product and the conversion rate.

The ordinary conditions for carrying out the reactions contemplated by the present invention are well known to the art and are disclosed in detail in the above-described Edris patent. Accordingly, the Edris patent is incorporated herein by reference to teach the basic elements of the polymerization process and the materials which may be employed therein.

What is claimed is:
1. In a process for preparing a polymer by:
   (A) polymerizing
      (1) in an aqueous emulsion medium
         (a) having a pH in the range of 6.5 to 8.3 at initial stage of the polymerization reaction and also throughout the process, and
         (b) containing dissolved therein as the sole emulsifying agent the solubilized shellac listed at (B)(1)(a) below
      (2) in the presence of a free radical polymerization initiator
   (B) a polymerization charge
      (1) comprising
         (a) from about 6 to about 30% of solubilized shellac,
         (b) up to about 75% of a monovinyl aromatic monomer,
         (c) up to about 25% of a member selected from the group consisting of aliphatic monovinyl monomers, aliphatic monovinylidene monomers and divinyl benzene, and
         (d) the balance of said polymerization charge comprising a conjugated diolefin monomer,
      (2) the percentages stated for the components (B)(1)(a) to (d) being based on the total weight of those components, and
      (3) the aggregate amount of component (B)(1)(c) comprising less than about twice the amount of diolefin monomer (B)(1)(d) of said charge, the aggregate of components (B)(1)(c) and (B)(1)(d) in said charge comprising at least 18% by weight of said charge, the improvement which comprises:

(C) introducing about one-half of said solubilized shellac (B)(1)(a) at the initial stage of the polymerization reaction, and
(D) introducing the remainder of said solubilized shellac (B)(1)(a)
   (1) in a plurality of increments
      (a) beginning at the stage of the reaction at which approximately 15% solids concentration has been reached, and
      (b) the increments being added at a rate to maintain the pH drift of the reaction mixture below 0.2 pH point.

2. An improved process in accordance with claim 1 wherein said increment of shellac is added at a rate relative to the solids content of the reaction mixture to maintain a substantially linear decreasing pH in the reaction mixture.

3. An improved process in accordance with claim 1 wherein the balance of shellac is added in about equal increments, the first of which is added at about 15% solids concentration, and the last of which is added when the solids concentration is about 5% below final solids concentration.

4. An improvement process in accordance with claim 1 wherein monomer (b) comprises styrene, monomer (d) comprises butadiene and the ratio of monomer (b) to monomer (d) is in the range of about 1.5 to about 4.

5. An improved process in accordance with claim 4 wherein said increment of shellac is added at a rate relative to the solids content of the reaction mixture to maintain a substantially linearly decreasing pH in the reaction mixture.

References Cited
UNITED STATES PATENTS 2,961,420  11/1960  Frey et al. _____ 260—27
3,291,766  12/1966  Edris _____ 260—27

DONALD E. CZAJA, Primary Examiner

W. E. PARKER, Assistant Examiner

U.S. Cl. X.R.
260—29.6, 80.7, 83.7

PO-1050
(5/69)

UNITED STATES PATENT OFFICE
CERTIFICATE OF CORRECTION

Patent No. 3,506,602           Dated  April 14, 1970

Inventor(s)   John C. Floros and Chung Hwei Wei

It is certified that error appears in the above-identified patent and that said Letters Patent are hereby corrected as shown below:

Col. 3, line 33, after "up" insert --of--

Col. 6, line 27, "linear" should read --linearly-- line 35, "improvement" should read --improved--

Signed and sealed this 18th day of January 1972.

(SEAL)
Attest:

EDWARD M. FLETCHER, JR.                ROBERT GOTTSCHALK
Attesting Officer                      Acting Commissioner of Patents